United States Patent
Vaarkamp et al.

(10) Patent No.: US 9,468,915 B2
(45) Date of Patent: *Oct. 18, 2016

(54) SELECTIVE CATALYTIC REDUCTION CATALYST SYSTEM

(71) Applicant: BASF Corporation, Florham Park, NJ (US)

(72) Inventors: Marius Vaarkamp, Burlington, NJ (US); Edgar V. Huennekes, Wunstorf (DE); Arne Kuhlmann, Hannover (DE); Stefan Kah, Hannover (DE)

(73) Assignee: BASF Corporation, Florham Park, NJ (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/208,928

(22) Filed: Mar. 13, 2014

(65) Prior Publication Data

US 2014/0274665 A1 Sep. 18, 2014

Related U.S. Application Data

(60) Provisional application No. 61/781,760, filed on Mar. 14, 2013.

(51) Int. Cl.
*B01D 50/00* (2006.01)
*B01J 29/072* (2006.01)
(Continued)

(52) U.S. Cl.
CPC .......... *B01J 29/072* (2013.01); *B01D 53/9404* (2013.01); *B01D 53/9418* (2013.01);
(Continued)

(58) Field of Classification Search
CPC .... B01J 29/30; B01J 63/066; B01J 35/0006; B01J 23/10; B01J 29/723; F01N 3/2066

USPC .............................. 422/177; 502/74, 100, 350
See application file for complete search history.

(56) References Cited

U.S. PATENT DOCUMENTS

| 3,030,181 A | 4/1962 | Milton et al. |
| 4,268,488 A | 5/1981 | Ginger |

(Continued)

FOREIGN PATENT DOCUMENTS

| DE | 102007003155 A1 | 7/2008 |
| EP | 1876331 | 8/2009 |

(Continued)

OTHER PUBLICATIONS

Kröcher, Oliver et al., Combination of $V_2O_4/WO_3$-$TiO_2$, Fe-ZSM5, and Cu-ZSM5 Catalysts for the Selective Catalytic Reduction of Nitric Oxide with Ammonia, *Ind. Eng. Chem. Res.* vol. 47 2008, 8588-8593.

(Continued)

*Primary Examiner* — Tom P Duong
(74) *Attorney, Agent, or Firm* — Womble Carlyle Sandridge & Rice LLP (57) ABSTRACT

Described are SCR catalyst systems comprising a first SCR catalyst composition and a second SCR catalyst composition arranged in the system, the first SCR catalyst composition having a faster DeNOx response time when exposed to ammonia than the second catalyst composition and the second SCR catalyst composition has a higher steady state DeNOx performance than the first catalyst composition. The SCR catalyst systems are useful in methods and systems to catalyze the reduction of nitrogen oxides in the presence of a reductant.

5 Claims, 4 Drawing Sheets (51) Int. Cl.

| | |
|---|---|
| *F01N 3/20* | (2006.01) |
| *B01J 23/22* | (2006.01) |
| *B01J 23/30* | (2006.01) |
| *B01J 29/06* | (2006.01) |
| *B01D 63/06* | (2006.01) |
| *B01D 69/12* | (2006.01) |
| *B01D 69/14* | (2006.01) |
| *B01D 71/02* | (2006.01) |
| *B01D 53/94* | (2006.01) |
| *B01J 37/02* | (2006.01) |
| *B01J 35/00* | (2006.01) |
| *B01J 23/02* | (2006.01) |
| *B01J 23/10* | (2006.01) |
| *B01J 23/72* | (2006.01) |
| *B01J 23/745* | (2006.01) |
| *B01J 29/72* | (2006.01) |
| *B01J 29/85* | (2006.01) |
| *B01J 21/04* | (2006.01) |
| *B01J 21/06* | (2006.01) |
| *B01J 29/70* | (2006.01) |
| *B01J 29/76* | (2006.01) |
| *B01J 37/00* | (2006.01) |
| *B01J 29/50* | (2006.01) |

(52) U.S. Cl.
CPC ....... *B01D53/9472* (2013.01); *B01D 53/9477* (2013.01); *B01D 63/066* (2013.01); *B01D 69/12* (2013.01); *B01D 69/141* (2013.01); *B01D 71/024* (2013.01); *B01D 71/028* (2013.01); *B01J 21/04* (2013.01); *B01J 21/063* (2013.01); *B01J 21/066* (2013.01); *B01J 23/02* (2013.01); *B01J 23/10* (2013.01); *B01J 23/22* (2013.01); *B01J 23/30* (2013.01); *B01J 23/72* (2013.01); *B01J 23/745* (2013.01); *B01J 29/061* (2013.01); *B01J 29/7015* (2013.01); *B01J 29/72* (2013.01); *B01J 29/723* (2013.01); *B01J 29/763* (2013.01); *B01J 29/85* (2013.01); *B01J 35/0006* (2013.01); *B01J 37/0036* (2013.01); *B01J 37/0244* (2013.01); *B01J 37/0246* (2013.01); *F01N 3/2066* (2013.01); *B01D 2251/2062* (2013.01); *B01D 2251/2067* (2013.01); *B01D 2255/2047* (2013.01); *B01D 2255/2065* (2013.01); *B01D 2255/2092* (2013.01); *B01D 2255/20707* (2013.01); *B01D 2255/20715* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/9022* (2013.01); *B01D 2255/9032* (2013.01); *B01D 2255/911* (2013.01); *B01D 2258/012* (2013.01); *B01D 2325/10* (2013.01); *B01J 29/50* (2013.01); *F01N 2510/0682* (2013.01); *F01N 2510/0684* (2013.01); *F01N 2570/18* (2013.01); *Y02C 20/10* (2013.01); *Y02T 10/24* (2013.01); *Y10S 502/52712* (2013.01); *Y10S 502/52713* (2013.01)

(56) References Cited

U.S. PATENT DOCUMENTS

| | | |
|---|---|---|
| 4,440,871 A | 4/1984 | Lok et al. |
| 4,544,538 A | 10/1985 | Zones |
| 4,735,927 A | 4/1988 | Gerdes et al. |
| 4,798,813 A | 1/1989 | Kato et al. |
| 4,952,545 A | 8/1990 | Imanari et al. |
| 5,409,681 A | 4/1995 | Kato et al. |
| 5,516,497 A | 5/1996 | Speronello et al. |
| 5,833,932 A | 11/1998 | Schmelz |
| 6,125,629 A | 10/2000 | Patchett |
| 6,162,415 A | 12/2000 | Liu et al. |
| 7,264,789 B1 | 9/2007 | Verduijn et al. |
| 7,462,340 B2 | 12/2008 | Schwefer et al. |
| 7,601,622 B2 | 10/2009 | Kim |
| 7,951,742 B2 | 5/2011 | Chen et al. |
| 8,741,240 B2 | 6/2014 | Hihara et al. |
| 9,017,626 B2 | 4/2015 | Tang et al. |
| 2008/0241034 A1 | 10/2008 | Schwefer et al. |
| 2009/0196812 A1 | 8/2009 | Bull et al. |
| 2009/0285737 A1 | 11/2009 | Bull et al. |
| 2010/0166628 A1 | 7/2010 | Soeger et al. |
| 2013/0121902 A1 | 5/2013 | Adelmann et al. |
| 2014/0271422 A1 | 9/2014 | Tang |

FOREIGN PATENT DOCUMENTS

| | | |
|---|---|---|
| GB | 868846 | 5/1961 |
| GB | 2493449 A | 2/2013 |
| WO | 2011/131324 A1 | 10/2011 |

OTHER PUBLICATIONS

English Language Abst. of DE 102007003155 Jul. 24, 2008.
International Search Report Jul. 7, 2014.

SELECTIVE CATALYTIC REDUCTION CATALYST SYSTEM

CROSS-REFERENCE TO RELATED APPLICATIONS

This application claims the benefit of priority under 35 U.S.C. §119(e) to U.S. Provisional Patent Application No. 61/781,760, filed on Mar. 14, 2013, which is hereby incorporated by reference in its entirety.

TECHNICAL FIELD

The present invention pertains to the field of selective catalytic reduction catalysts. More particularly, embodiments of the invention relate to selective catalytic reduction catalyst systems comprising a first SCR catalyst composition and a second SCR catalyst composition, a lean burn engine exhaust system, and methods of using these catalyst systems in a variety of processes such as abating pollutants in exhaust gases.

BACKGROUND

Operation of lean burn engines, e.g. diesel engines and lean burn gasoline engines, provide the user with excellent fuel economy and have very low emissions of gas phase hydrocarbons and carbon monoxide due to their operation at high air/fuel ratios under fuel lean conditions. Diesel engines, in particular, also offer significant advantages over gasoline engines in terms of their durability and their ability to generate high torque at low speed.

From the standpoint of emissions, however, diesel engines present problems more severe than their spark-ignition counterparts. Emission problems relating to particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others. NO is of concern because it is believed to under a process known as photo-chemical smog formation, through a series of reactions in the presence of sunlight and hydrocarbons, and NO is a significant contributor to acid rain. $NO_2$, on the other hand, has a high potential as an oxidant and is a strong lung irritant. Particulates (PM) are also connected with respiratory problems. As engine operation modifications are made to reduce particulates and unburned hydrocarbons on diesel engines, the NO and $NO_2$ emissions tend to increase.

Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions Selective catalytic reduction (SCR), using ammonia or ammonia precursor as reducing agent is believed to be the most viable technique for the removal of nitrogen oxides from the exhaust of diesel vehicles. In typical exhaust, the nitrogen oxides are mainly composed of NO (>90%), so the SCR catalyst favors the conversion of NO and $NH_3$ into nitrogen and water. Two major challenges in developing catalysts for the automotive application of the ammonia SCR process are to provide a wide operating window for SCR activity, including low temperatures of from 200° C. and higher and improvement of the catalyst's hydrothermal stability for temperatures above 500° C. As used herein hydrothermal stability refers to retention of a material's capability to catalyze the SCR of $NO_x$, with a preference for the retention to be at least 85% of the material's $NO_x$ conversion ability prior to hydrothermal aging.

Metal-promoted zeolite catalysts including, among others, iron-promoted and copper-promoted zeolite catalysts, where, for instance, the metal is introduced via ion-exchange, for the selective catalytic reduction of nitrogen oxides with ammonia are known. Iron-promoted zeolite beta has been an effective catalyst for the selective reduction of nitrogen oxides with ammonia. Unfortunately, it has been found that under harsh hydrothermal conditions, such as reduction of $NO_x$ from gas exhaust at temperatures exceeding 500° C., the activity of many metal-promoted zeolites, such as Cu and Fe versions of ZSM-5 and Beta, begins to decline. This decline in activity is believed to be due to destabilization of the zeolite such as by dealumination and consequent loss of metal-containing catalytic sites within the zeolite.

To maintain the overall activity of $NO_x$ reduction, increased levels of the washcoat loading of the iron-promoted zeolite catalyst must be provided. As the levels of the zeolite catalyst are increased to provide adequate $NO_x$ removal, there is an obvious reduction in the cost efficiency of the process for $NO_x$ removal as the costs of the catalyst rise.

In some SCR systems, particularly heavy duty diesel (HDD), controlling secondary pollutant $N_2O$ emitted from the SCR system has become more important. Additionally, certain existing catalysts, such as copper promoted zeolites, tend to produce unacceptably high $N_2O$ emissions. Because $N_2O$ is a greenhouse gas and emissions regulations are becoming increasingly stringent, there is a need for systems that reduce the amount of $N_2O$ emitted from SCR systems.

SUMMARY

One aspect of the invention pertains to a selective catalytic reduction (SCR) catalyst system. In a first embodiment, a selective catalytic reduction (SCR) catalyst hybrid system for removing NOx from engine exhaust is provided, the system comprises a first SCR catalyst composition and a second SCR catalyst composition arranged in the system, the first SCR catalyst composition having a faster DeNOx response time when exposed to ammonia than the second catalyst composition and the second SCR catalyst composition has a higher steady state DeNOx performance than the first catalyst composition. In a second embodiment, the first embodiment is modified such that the first SCR catalyst composition provides a target DeNOx percentage at a lower ammonia storage level than the second SCR catalyst composition to provide the same DeNOx percentage, and wherein the system provides higher DeNOx steady state performance than a system with only the first catalyst composition.

In a third embodiment, the first and second embodiments are modified, wherein under acceleration conditions in which sudden increases of exhaust temperature are produced, ammonia desorbed from the hybrid system due to the temperature increase is less than ammonia desorbed from a system having only the second catalyst composition.

In a fourth embodiment, the first through third embodiments are modified, wherein the first catalyst composition comprises vanadia/titania stabilized with tungsten.

In a fifth embodiment, the first through fourth embodiments are modified, wherein the second catalyst composition comprises a metal-exchanged zeolite.

In a sixth embodiment, the first through fifth embodiments are modified, wherein the metal comprises copper. In a seventh embodiment, the first through sixth embodiments are modified, wherein the first SCR catalyst composition promotes higher $N_2$ formation and lower $N_2O$ formation than the second SCR catalyst composition, and the second SCR catalyst composition promotes lower $N_2$ formation and higher $N_2O$ formation for a temperature range of 200° C. to 600° C.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Governmental regulations require the use of $NO_x$ reduction technologies for light and heavy-duty lean burn engine vehicles. Selective catalytic reduction (SCR) of $NO_x$ using urea is an effective and dominant emission control technology for $NO_x$ control. To meet future governmental regulations, an SCR catalyst system that has improved performance compared to the current systems. Embodiments of the invention pertain to an SCR catalyst system having lower $N_2O$ emissions and also $NO_x$ conversion efficiency improvement at low $NH_3$ storage levels than single SCR catalysts and other dual SCR catalyst systems. Without intending to be bound by theory, it is thought that the dynamic response of the SCR catalyst system according to one or more embodiments is provided by improved $NH_3$ storage capacity. The features of the invention described herein should be provided over the entire SCR temperature range of interest, namely 200° C. to 600° C.

According to one or more embodiments, the first and second SCR catalyst compositions exclude platinum group metals such as Pt, Pd and Rh.

Embodiments of the invention are directed to SCR catalyst systems, methods for their preparation, exhaust gas purification systems, and methods of abating nitrogen oxides from exhaust gases using such SCR catalyst systems.

Embodiments are directed to the use of SCR catalyst systems providing improved $NO_x$ performance for lean burn engines. While the SCR catalyst systems can be used in any lean burn engine, in specific embodiments, the catalyst systems are to be used in heavy duty diesel applications. Heavy duty diesel applications include diesel engine powered vehicles having a gross vehicle weight rating (GVWR) of above 8,500 lbs federally and above 14,000 lbs in California (model year 1995 and later). The SCR catalyst systems according to embodiments may have use in other engines as well, including, but not limited to, nonroad diesel engines, locomotives, marine engines, and stationary diesel engines. The invention may have applicability to other lean burn engines types as well such as light duty diesel, compressed natural gas and lean burn gasoline direct injected engines.

With respect to the terms used in this disclosure, the following definitions are provided.

As used herein, the term "catalyst" or "catalyst composition" refers to a material that promotes a reaction. As used herein, the phrase "catalyst system" refers to a combination of two or more catalysts, for example a combination of a first SCR catalyst and a second SCR catalyst. The catalyst system may be in the form of a washcoat in which the two SCR catalysts are mixed together.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing a slurry containing a specified solids content (e.g., 30-90% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

"Catalytic article" refers to an element that is used to promote a desired reaction. For example, a catalytic article may comprise a washcoat containing catalytic compositions on a substrate.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silicamagnesia, zircon silicate, sillimanite, a magnesium silicate, zircon, petalite, α-alumina, an aluminosilicate and the like.

The substrates useful for the catalyst compositions of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

According to a first aspect of the invention, a selective catalytic reduction (SCR) catalyst system comprises a first SCR catalyst composition and a second SCR catalyst composition arranged in the system. In one or more embodiments, the second SCR catalyst composition has a different composition than first SCR catalyst composition. The first SCR catalyst composition promotes higher $N_2$ formation and lower $N_2O$ formation than the second SCR catalyst composition, while the second catalyst composition promotes lower $N_2$ formation and higher $N_2O$ formation than the first SCR catalyst composition. To reduce $NH_3$ emissions, in one or more embodiments, the first SCR catalyst should have a lower $NH_3$ adsorption capacity/desorption temperature than the second SCR catalyst composition.

In one or more embodiments, the first SCR catalyst composition and the second SCR catalyst composition are on the same or a common substrate. In other embodiments, the first SCR catalyst composition and second SCR catalyst composition are on separate substrates.

In one embodiment, the first SCR catalyst and the second SCR catalyst are arranged in a laterally zoned configuration, with the first catalyst upstream from the second catalyst. The upstream and downstream catalysts can be arranged on the same substrate or on different substrates separated from each other. Each of these embodiments will be described in more detail below.

In specific embodiments, each of the first SCR catalyst composition and second SCR catalyst composition is used as a molded catalyst, still more specifically as a molded catalyst wherein the SCR catalyst composition is deposited on a suitable refractory substrate, still more specifically on a "honeycomb" substrate, for the selective reduction of nitrogen oxides $NO_x$, i.e. for selective catalytic reduction of nitrogen oxides. According to embodiments of the invention, the SCR catalyst composition can be in the form of self-supporting catalyst particles or as a honeycomb monolith formed of the SCR catalyst composition.

According to one or more embodiments, the first SCR catalyst composition comprises a mixed oxide. As used herein, the term "mixed oxide" refers to an oxide that contains cations of more than one chemical element or cations of a single element in several states of oxidation. In one or more embodiments, the mixed oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina, Mn/titania (e.g. $MnO_x/TiO_2$) (e.g. $MnO_x/Al_2O_3$), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. In specific embodiments, the mixed oxide comprises vanadia/titania. The vanadia/titania oxide can be activated or stabilized with tungsten (e.g. $WO_3$) to provide $V_2O_5/TiO_2/WO_3$.

According to one or more embodiments, a first SCR catalyst composition comprising vanadia/titania generates significantly less $N_2O$ than zeolite SCR catalysts, especially under rich $NO_2$ conditions. In one or more embodiments, the first SCR catalyst composition comprises titania on to which vanadia has been dispersed. The vanadia can be dispersed at concentrations ranging from 1 to 10 wt %, including 1, 2, 3, 4, 5, 6, 7, 8, 9, 10 wt %. In specific embodiments the vanadia is activated or stabilized by tungsten ($WO_3$). The tungsten can be dispersed at concentrations ranging from 0.5 to 10 wt %, including 1, 2, 3, 3, 4, 5, 6, 7, 8, 9, and 10, wt %. All percentages are on an oxide basis.

According to one or more embodiments, the second SCR catalyst comprises a metal-exchanged molecular sieve. The metal is selected from Cu, Fe, Co, Ni, Ce and Pt. In specific embodiments, the metal is Cu.

As used herein, the term "molecular sieves" refers to materials based on an extensive three-dimensional network of oxygen ions containing generally tetrahedral type sites and having a pore distribution. Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter.

Catalyst compositions employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

In more specific embodiments, reference to an aluminosilicate zeolite structure type limits the material to molecular sieves that do not include phosphorus or other metals substituted in the framework. Of course, aluminosilicate zeolites may be subsequently ion-exchanged with one or more promoter metals such as iron, copper, cobalt, nickel, cerium or platinum group metals. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. In one or more embodiments, the molecular sieve can include all aluminosilicate, borosilicate, gallosilicate, MeAPSO, and MeAPO compositions. Wt % of Promoter Metal:

The promoter metal (e.g. Cu) content of the metal-exchanged molecular sieve, calculated as the metal oxide, in specific embodiments is at least about 2 wt.-%, even more specifically at least about 2.5 wt.-% and in even more specific embodiments at least about 3 wt.-%, reported on a volatile-free basis. In even more specific embodiments, the metal (e.g. Cu) content of the metal-exchange molecular sieve, calculated as the metal oxide, is in the range of up to about 8 wt.-%, based on the total weight of the calcined molecular sieve reported on a volatile free basis. Therefore, in specific embodiments, ranges of the 8 molecular sieve promoted with a metal selected from Cu, Fe, Co, Ce, and Ni, calculated as the metal oxide, are from about 2 to about 8 wt.-%, more specifically from about 2 to about 5 wt.-%, and even more specifically from about 2.5 to about 3.5 wt.-%, in each case reported on an oxide basis.

In one or more embodiments, the first SCR catalyst and the second SCR catalyst are arranged in a laterally zoned configuration, with the first catalyst upstream from the second catalyst. As used herein, the term "laterally zoned" refers to the location of the two SCR catalysts relative to one another. Lateral means side-by-side such that the first SCR catalyst composition and the second SCR catalyst composition are located one beside the other with the first SCR catalyst composition upstream of the second SCR catalyst composition. According to one or more embodiments, the laterally zoned first and second SCR catalysts can be arranged on the same or a common substrate or on different substrates separated from each other.

Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

Figure 1:
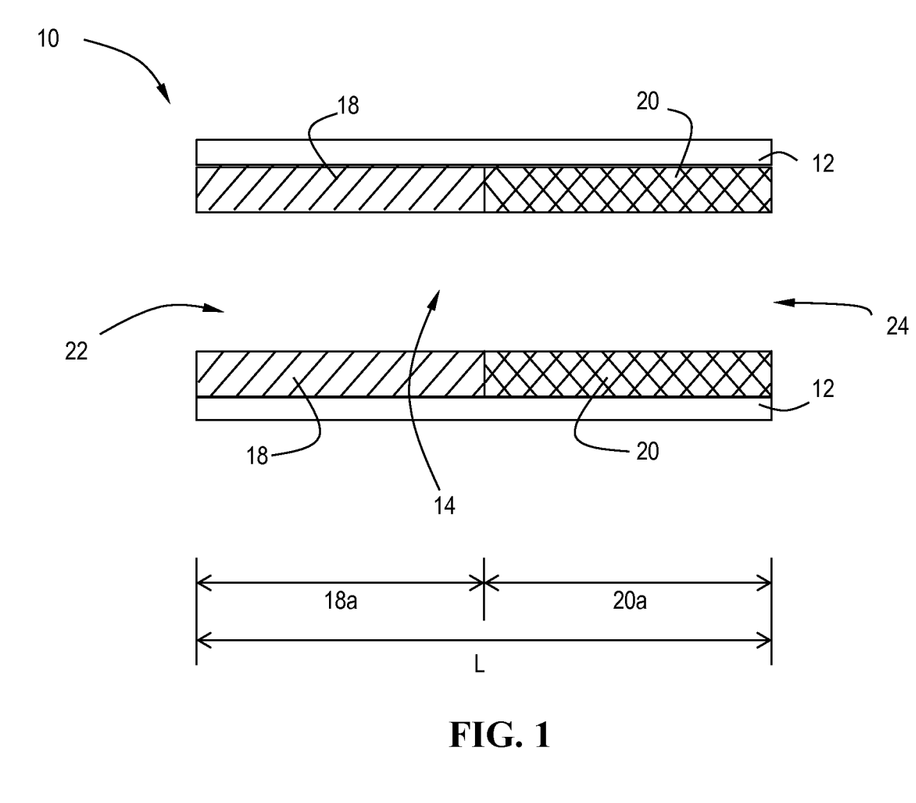
FIG. 1 shows a partial cross-sectional view of a SCR catalyst system according to one or more embodiments.

Referring to FIG. 1, an exemplary embodiment of a laterally spaced system is shown. The SCR catalyst system 10 is shown in a laterally zoned arrangement where the first SCR catalyst composition 18 is located upstream of the second SCR catalyst composition 20 on a common substrate 12. The substrate 12 has an inlet end 22 and an outlet end 24 defining an axial length L. In one or more embodiments, the substrate 12 generally comprises a plurality of channels 14 of a honeycomb substrate, of which only one channel is shown in cross-section for clarity. The first SCR catalyst composition 18 extends from the inlet end 22 of the substrate 12 through less than the entire axial length L of the substrate 12. The length of the first SCR catalyst composition 18 is denoted as first zone 18a in FIG. 1. The first SCR catalyst composition 18 can, in specific embodiments comprise vanadia/titania. The second SCR catalyst composition 20 can, in specific embodiments, comprise a metal-exchanged molecular sieve. The second SCR catalyst composition 20 extends from the outlet end 24 of the substrate 12 through less than the entire axial length L of the substrate 12. The length of the second catalyst composition is denoted as the second zone 20b in FIG. 1. The SCR catalyst system 10 is effective for the selective catalytic reduction of $NO_x$.

It will be appreciated that length of the first zone and the second zone can be varied. In one or more embodiments, the first zone and second zone can be equal in length. In other embodiments, the first zone can be 20%, 25%, 35% or 40%, 60%, 65%, 75% or 80% of the length L of the substrate, with the second zone respectively covering the remainder of the length L of the substrate.

Figure 2:
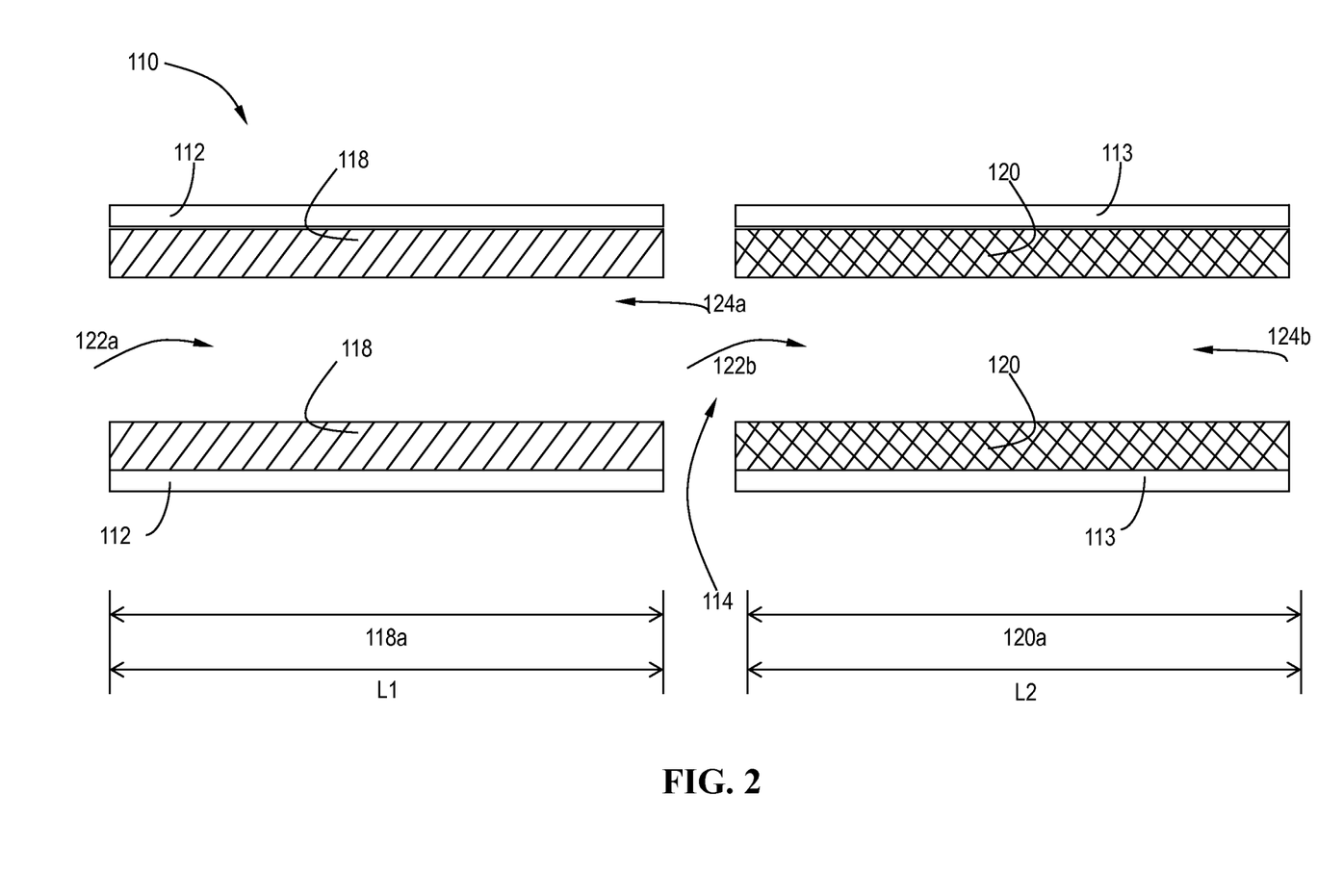
FIG. 2 shows a partial cross-sectional view of a SCR catalyst system according to one or more embodiments.

Referring to FIG. 2, another embodiment of a laterally zoned SCR catalyst system 110 is shown. The SCR catalyst system 110 shown is a laterally zoned arrangement where the first SCR catalyst composition 118 is located upstream of the second SCR catalyst composition 120 on separate substrates 112 and 113. The first SCR catalyst composition 118 is disposed on a substrate 112, and the second SCR catalyst composition is disposed on a separate substrate 113. The substrates 112 and 113 can be comprised of the same material or a different material. The substrate 112 has an inlet end 122a and an outlet end 124a defining an axial length L1. The substrate 113 has an inlet end 122b and an outlet end 124b defining an axial length L2. In one or more embodiments, the substrates 112 and 113 generally comprise a plurality of channels 114 of a honeycomb substrate, of which only one channel is shown in cross-section for clarity. The first SCR catalyst composition 118 extends from the inlet end 122a of the substrate 112 through the entire axial length L1 of the substrate 112 to the outlet end 124a. The length of the first SCR catalyst composition 118 is denoted as first zone 118a in FIG. 2. The first SCR catalyst composition 118 can, in specific embodiments, comprise vanadia/titania. The second SCR catalyst composition 120 can, in specific embodiments, comprise a metal-exchanged molecular sieve. The second SCR catalyst composition 120 extends from the outlet end 124b of the substrate 113 through the entire axial length L2 of the substrate 113 to the inlet end 122b. The second catalyst composition 120 defines a second zone 120a. The SCR catalyst system 110 is effective for the selective catalytic reduction of $NO_x$. The length of the zones 118a and 120a can be varied as described with respect to FIG. 1.

Exhaust Gas Treatment System:

In one aspect of the invention, exhaust gas treatment system comprises a lean burn engine, and exhaust gas conduit in fluid communication with the lean burn engine, and a selective catalytic reduction catalyst system including a first SCR catalyst composition and a second SCR catalyst composition arranged in the system according to one or more embodiments. In specific embodiments, the lean burn engine is a heavy duty diesel engine.

In one or more embodiments, the exhaust gas treatment system includes an exhaust gas stream containing a reductant such as ammonia, urea and/or hydrocarbon, and in specific embodiments, ammonia and/or urea. In specific embodiments, the exhaust gas treatment system further comprises a second exhaust gas treatment component, for example, a soot filter or a diesel oxidation catalyst.

The soot filter, catalyzed or non-catalyzed, may be upstream or downstream of the SCR catalyst system according to one or more embodiment. The diesel oxidation catalyst in specific embodiments is located upstream of the SCR catalyst system according to one or more embodiments. In specific embodiments, the diesel oxidation catalyst and the catalyzed soot filter are upstream from the SCR catalyst system.

In specific embodiments, the exhaust is conveyed from the lean burn engine to a position downstream in the exhaust system, and, in more specific embodiments, containing $NO_x$, where a reductant is added and the exhaust stream with the added reductant is conveyed to the SCR catalyst system according to one or more embodiments.

In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst may be provided downstream of the SCR catalyst system to remove any slipped ammonia from the system. In specific embodiments, the AMOX catalyst may comprise a platinum group metal such as platinum, palladium, rhodium or combinations thereof. In more specific embodiment, the AMOX catalyst can include a washcoat containing SCR catalyst system including a first SCR catalyst composition disposed on a substrate and a second SCR catalyst composition disposed on a substrate.

AMOX and/or SCR catalyst composition can be coated on the flow through or wall-flow filter. If a wall flow substrate is utilized, the resulting system will be able to remove particulate matter along with gaseous pollutants.

The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

SCR Activity:

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Dynamic Response Modeling

Figure 3:
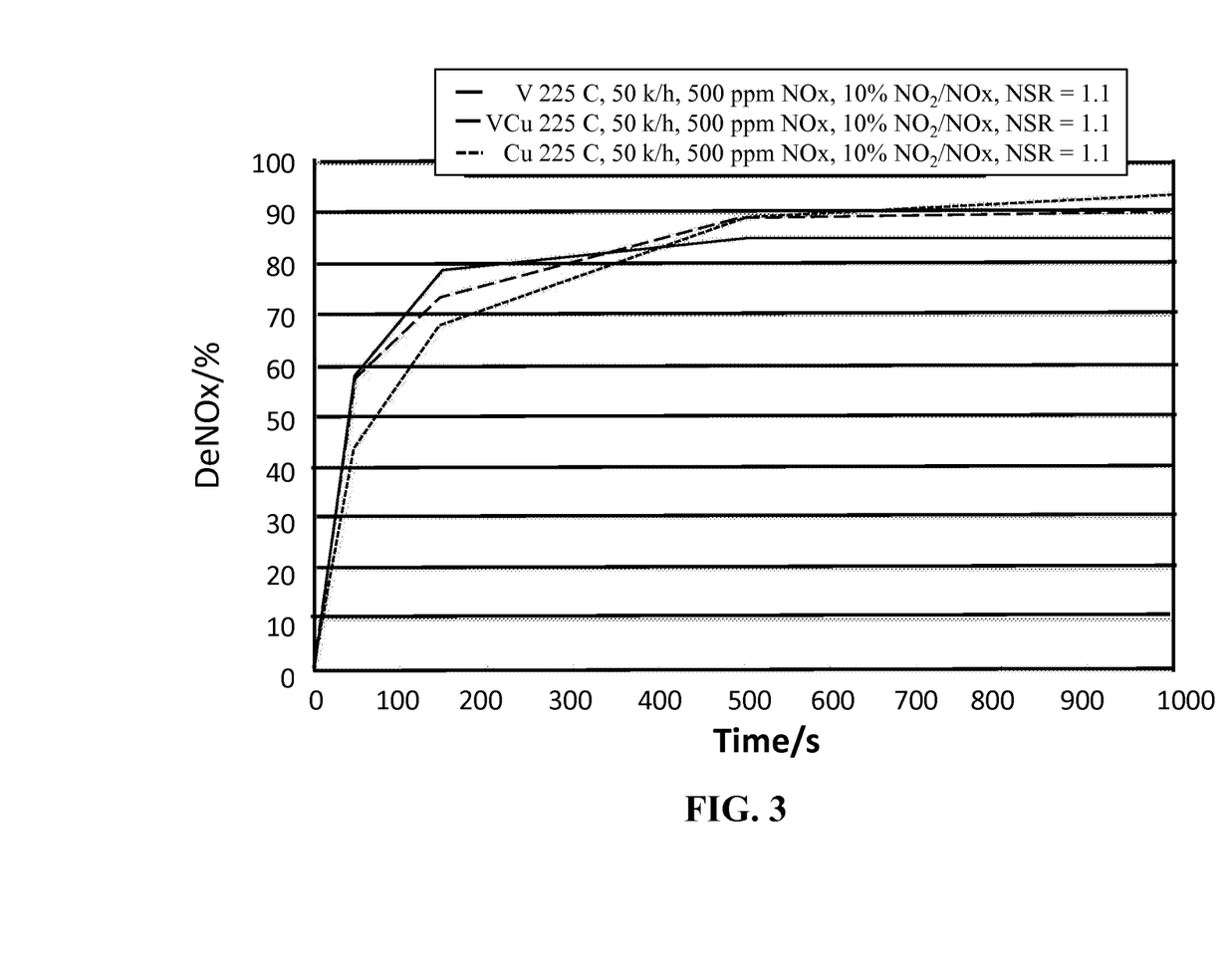
FIG. 3 is a graph generated by a computer model, showing an Analysis of Response Curves—$DeNO_x$ vs. Time at 225° C. and 10% $NO_2$.
Figure 4:
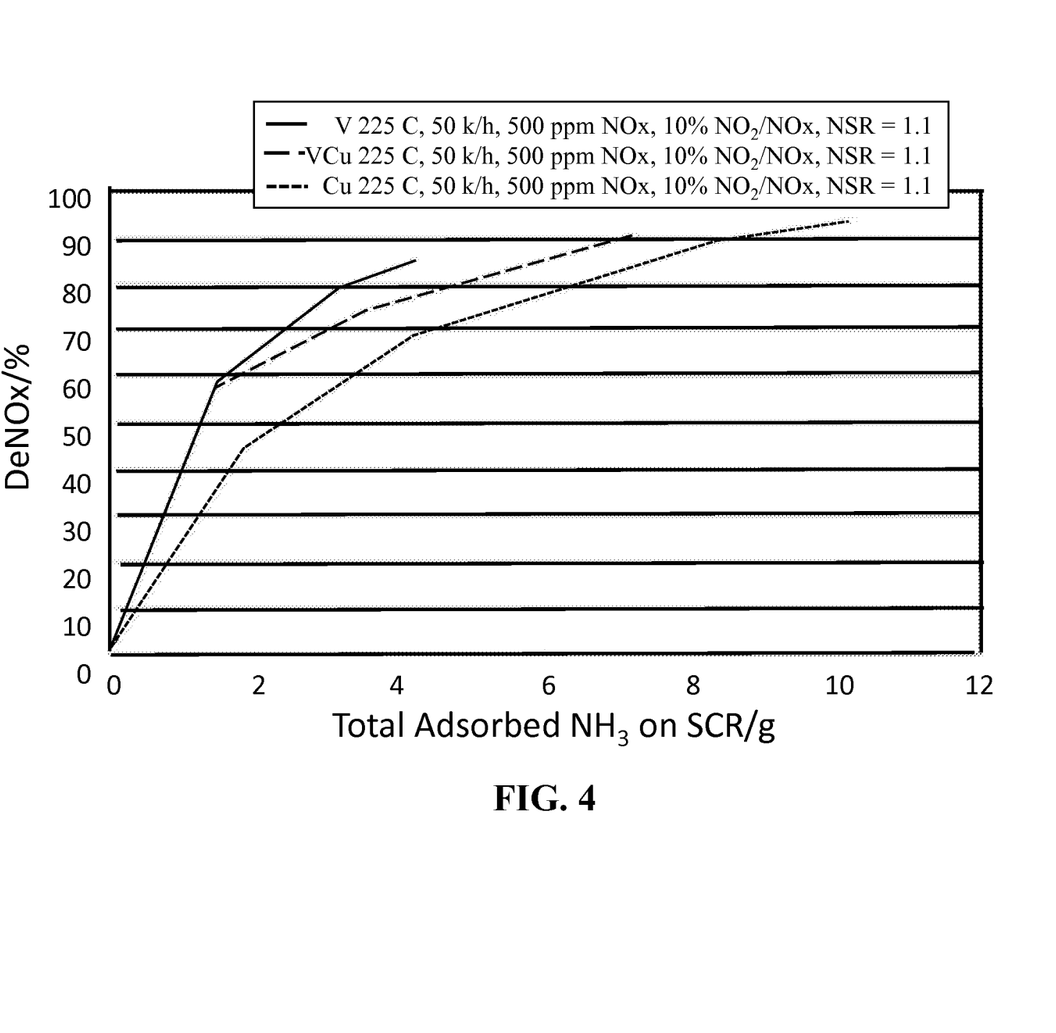
FIG. 4 is a graph generated by a computer model, showing an Analysis of Response Curves—$DeNO_x$ vs. Total Absorbed $NH_3$ at 225° C. and 10% $NO_2$.

FIGS. 3 and 4 illustrate the improvements in dynamic response behavior of a system according to one or more embodiments. FIGS. 3 and 4 were prepared using a computer model. Lab reactor and engine lab $DeNO_x$ performance measurements to describe the performance of the individual components within the system are the input for the computer model used. The example in FIG. 3 shows the $DeNO_x$ performance as a function of time obtained with fresh systems without ammonia stored prior to the start of the simulation/urea dosing. A Cu-zeolite system and a Vanadia based SCR system are compared with the Vanadia/Cu-zeolite hybrid system. The Vanadia based SCR catalyst was placed in front of the Cu-zeolite catalyst with a 50/50 size ratio within the modeled hybrid system. Low temperature operation at 225° C. exhaust temperature and 50000 l/h space velocity at 500 ppm $NO_x$ inlet concentration at an $NO_2/NO_x$ ratio of 10% was used for the comparison. These SCR inlet conditions can be seen as being typical for systems operated in engine applications with a low precious metal loading on an oxidation system in front of the SCR or in SCR only systems. The NSR was chosen at 1.1 in order to reach relatively fast the maximum $DeNO_x$ performance of the systems studied. Although the Cu-zeolite system reaches higher $DeNO_x$ performances after 700 sec. of dosing, the $DeNO_x$ response behavior after start of dosing at 0 sec. has a different ranking. The response of the Vanadia based SCR system is faster relative to the $DeNO_x$ increase after start of dosing compared with the Cu-zeolite system (e.g. up to 350 sec.). The hybrid system Vanadia-based SCR in combination with the Cu-zeolite has the advantage of being close to the dynamic response behavior of the Vanadia-based SCR and additionally delivering higher steady state $DeNO_x$ performances as indicated in FIG. 3 after, for example, 1000 sec.

FIG. 4 was generated by re-plotting FIG. 3 by using the total adsorbed $NH_3$ on the catalysts in grams as the x-axis results. The practical advantage of the hybrid system can be seen when comparing the necessary ammonia stored on the catalysts to reach e.g. 70% $DeNO_x$. The Cu-zeolite system needs approximately 4.5 g $NH_3$, while the Vanadia-based system would need approximately 2.5 g, and the proposed hybrid system approximately 3 g ammonia stored. The hybrid system therefore would deliver $DeNO_x$ performance faster and at lower $NH_3$ storage levels compared with the Cu-zeolite SCR system. Furthermore the hybrid system would deliver higher $DeNO_x$ steady state performance compared with the Vanadia based SCR system. The higher $DeNO_x$ performance reached at lower $NH_3$ storage levels has a further advantage when the engine accelerates with sudden increases in exhaust temperature. In this case, the amount of ammonia desorbed from the catalysts due to the temperature increase is less for the hybrid system compared with the Cu-zeolite system and therefore would result into lower $NH_3$ slip values behind the SCR portion of the aftertreatment system. Even when using an ammonia oxidation catalyst is used to control the $NH_3$ slip coming from the SCR, very high ammonia peaks from acceleration events are often issues for the ammonia oxidation catalyst due to the typical volumes installed in combination with the ammonia light-off characteristics.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A selective catalytic reduction (SCR) catalyst hybrid system for removing NOx from engine exhaust, the system comprising a first SCR catalyst composition and a second SCR catalyst composition arranged in the system, the first SCR catalyst composition having a faster DeNOx response time when exposed to ammonia than the second catalyst composition and the second SCR catalyst composition has a higher steady state DeNOx performance than the first catalyst composition;
   wherein the first catalyst composition comprises vanadia/titania stabilized with tungsten; and
   wherein the second catalyst composition comprises a metal-exchanged zeolite, excluding Cu-exchanged or Fe-exchanged ZSM-5 or Beta zeolites.

2. The system of claim 1, wherein the first SCR catalyst composition provides a target DeNOx percentage at a lower ammonia storage level than the second SCR catalyst composition to provide the same DeNOx percentage, and wherein the system provides higher DeNOx steady state performance than a system with only the first catalyst composition.

3. The system of claim 2, wherein under acceleration conditions in which sudden increases of exhaust temperature are produced, ammonia desorbed from the hybrid system due to the temperature increase is less than ammonia desorbed from a system having only the second catalyst composition.

4. The catalyst system of claim 1, wherein the metal comprises Cu.

5. The catalyst system of claim 1, wherein the first SCR catalyst composition promotes higher $N_2$ formation and lower $N_2O$ formation than the second SCR catalyst composition, and the second SCR catalyst composition promotes lower $N_2$ formation and higher $N_2O$ formation for a temperature range of 200° C. to 600° C.

* * * * *